US012770098B2

(12) United States Patent
Bauer et al.

(10) Patent No.: US 12,770,098 B2
(45) Date of Patent: Oct. 20, 2026

(54) INVENTORY MANAGEMENT SYSTEM FOR MANAGING CONSUMER PRODUCTS ON A VEHICLE

(71) Applicants: Airbus Operations GmbH, Hamburg (DE); Airbus (China) Enterprise Management and Services Company Limited, Beijing (CN)

(72) Inventors: Michael Bauer, Hamburg (DE); Yiwen Mai, Beijing (CN); Ronald Pieter Sweers, Hamburg (DE)

(73) Assignees: Airbus Operations GmbH, Hamburg (DE); Airbus (China) Enterprise Management and Services Company Limited, Beijing (CN)

( * ) Notice: Subject to any disclaimer, the term of this patent is extended or adjusted under 35 U.S.C. 154(b) by 28 days.

(21) Appl. No.: 18/687,982

(22) PCT Filed: Aug. 10, 2022

(86) PCT No.: PCT/EP2022/072449

§ 371 (c)(1),
(2) Date: Feb. 29, 2024

(87) PCT Pub. No.: WO2023/030843

PCT Pub. Date: Mar. 9, 2023

(65) Prior Publication Data

US 2024/0370823 A1 Nov. 7, 2024

(30) Foreign Application Priority Data

Sep. 1, 2021 (EP) .................................... 21194312

(51) Int. Cl.

| | |
|---|---|
| ***G06Q 10/087*** | (2023.01) |
| ***G06K 7/14*** | (2006.01) |
| ***G06V 10/70*** | (2022.01) |

(52) U.S. Cl.
CPC ......... *G06Q 10/087* (2013.01); *G06K 7/1404* (2013.01); *G06V 10/70* (2022.01)

(58) Field of Classification Search
CPC .... G06Q 10/087; G06Q 50/40; G06K 7/1404; G06V 10/70
See application file for complete search history.

(56) References Cited

U.S. PATENT DOCUMENTS 9,402,016 B1 * 7/2016 Hidalgo ................. H04N 23/51
9,616,822 B1 * 4/2017 Hamilton ............ B60R 11/0241

(Continued)

FOREIGN PATENT DOCUMENTS

DE 102007007717 A1 8/2008
DE 102009058327 A1 4/2011
EP 3553717 A1 * 10/2019 ........... G06Q 10/087

OTHER PUBLICATIONS

MC Tested: RAM Mounts X-Grip and Tough-Claw Cell Phone Mount For Motorcycles, Will Steenrod Oct. 15, 2016, https://www.motorcyclistonline.com/mc-tested-ram-mounts-x-grip-and-tough-claw-cell-phone-mount-for-motorcycles/ (Year: 2016).*

(Continued)

*Primary Examiner* — Michael Jared Walker
(74) *Attorney, Agent, or Firm* — KDW Firm PLLC

(57) ABSTRACT

An inventory management system for managing consumer products on a vehicle, in particular an aircraft, includes a portable product-identification device configured to identify a consumer product presented to the product-identification device, wherein the product-identification device is configured to communicatively connect to a wireless network of the vehicle to update a central inventory of the vehicle based on the identified consumer product, and a detachable holder having a clamping arm configured to releasably clamp the holder to a service device within the vehicle and having a mounting plate configured to releasably attach to the prod- (Continued)

uct-identification device to mount the product-identification device on the holder and thereby on the respective service device within the vehicle.

19 Claims, 2 Drawing Sheets

(56) References Cited

U.S. PATENT DOCUMENTS

| | | | | |
|---|---|---|---|---|
| 10,592,842 | B2 * | 3/2020 | High | G06Q 10/083 |
| 10,643,176 | B2 * | 5/2020 | Jones | G06Q 10/087 |
| 2002/0010633 | A1 * | 1/2002 | Brotherston | B64D 11/0015 705/26.8 |
| 2006/0085308 | A1 * | 4/2006 | Metzger | G07F 7/0886 705/34 |
| 2009/0219674 | A1 * | 9/2009 | Lin | F16M 13/00 361/679.01 |
| 2016/0321603 | A1 * | 11/2016 | Williams | G06Q 30/0635 |
| 2019/0311318 | A1 * | 10/2019 | Bauer | B65G 1/0492 |
| 2020/0341511 | A1 * | 10/2020 | Li | G06F 1/1616 |
| 2021/0319392 | A1 * | 10/2021 | Patil | G06Q 10/08 |
| 2022/0327471 | A1 * | 10/2022 | Hoffman | G06N 3/08 |

OTHER PUBLICATIONS

Phone mounts for bikes ranked (Year: 2016).*
International Search Report and Written Opinion for Application No. PCT/EP2022/072449 dated Nov. 9, 2022.
European Search Report for Application No. 21194312 dated Feb. 16, 2022.
European Office Action in EP Application No. 21194312.1 dated Jul. 29, 2026, 8 pages.

* cited by examiner

INVENTORY MANAGEMENT SYSTEM FOR MANAGING CONSUMER PRODUCTS ON A VEHICLE

This application is a national stage filing under 35 U.S.C. 371 of pending International Application No. PCT/EP2022/072449, filed Aug. 10, 2022, which claims priority to EP patent application Ser. No. 21/194,312.1, filed Sep. 1, 2021, the entireties of which applications are incorporated by reference herein.

TECHNICAL FIELD

The present invention pertains to an inventory management system for managing consumer products on a vehicle, in particular an aircraft.

BACKGROUND

Although the present invention can be used in a variety of applications, it is presently explained in more detail with respect to passenger aircraft. However, the described methods and devices can also be used in different vehicles and in all fields of the transportation industry, for example for road vehicles, for rail vehicles, for aircraft and/or for watercraft.

Galleys which are currently provided on board of modern passenger aircraft usually comprise storage locations or slide-in unit compartments into which trolleys, containers, boxes and/or other service units can be moved or inserted, said service units being loaded with supplies or service products such as e.g. food and/or drinks to be supplied to the passengers on board the aircraft. In order to indicate the contents of trolleys or containers these are classically provided with labels, which the catering company applies before or during the loading process. In addition, lists are produced from which the cabin crew can obtain a breakdown of the available service products and their storage positions in the aircraft galley. Since these lists for the cabin crew only convey the initial loading state of the aircraft galley, it can be demanding for the cabin crew to maintain an overview of the stock of the galley during the flight.

In a more general context, it may be beneficial for airlines, caterers and manufacturers to obtain an overview of all catering related data, be it on-board or offboard. Statistics on food and beverage consumption across flights and flight routes may provide helpful insights into product consumption, passenger preferences, item availability, waste generation as well as costs. For example, by monitoring product consumption on board of an aircraft, airlines may be able to improve onboard service efficiency and thereby enhance passenger satisfaction amongst others. In another example, the amount of waste that is generated on each flight may be assessed and categorized, which in turn may help to improve waste management across the flight routes of the airline.

Hence, inventory management for various elements inside an aircraft cabin and it's operation may be seen as one key element to improve operational efficiency, reducing or avoiding waste, as it also might decrease weight and support to reduce cabin crew workload in the entire process. It includes all consumable items, such as food and drinks, but might also be enlarged to other elements, such as towels, toilet paper, newspapers or magazines, duty-free products etc. In the particular case of catering supplies, the entire process includes the full end to end chain from meal production to supply chain, service and finally waste collection and handling. All in all, inventory management may be seen as an enabler towards a more sustainable operation and travel experience for the passenger.

Document DE 10 2009 058 327 A1 discloses a system for stock keeping in an aircraft galley, in which system receptacle devices such as standard units, slide-in units or trolleys or the like are provided with transponders which emit identification signals which are characteristic of the content thereof and are in turn read in by a transceiver unit of the galley in order to determine the stock of the galley.

SUMMARY

Against this background, it is an object of the present invention to find solutions for simplifying inventory management on board of a vehicle.

This object is achieved by an inventory management system having the features of claim 1 and an aircraft having the features of claim 13.

According to an aspect of the invention, an inventory management system for managing consumer products on a vehicle, in particular an aircraft, comprises a portable product-identification device configured to identify a consumer product presented to the product-identification device, wherein the product-identification device is configured to communicatively connect to a wireless network of the vehicle to update a central inventory of the vehicle based on the identified consumer product; and a detachable holder having a clamping arm configured to releasably clamp the holder to a service device within the vehicle and having a mounting plate configured to releasably attach to the product-identification device to mount the product-identification device on the holder and thereby on the respective service device within the vehicle.

According to a further aspect of the invention, an aircraft comprises an inventory management system according to the invention.

Thus, one idea of the present invention is to provide an item scanning device that is not permanently fixed within a cabin of the vehicle but instead can be temporarily attached to any service device within the cabin. The invention relies on the insight that capturing the product data is the key to enable full service capabilities.

As economic viability is important, the technical means should be as simple as possible with minimal modifications on the cabin elements. While most inventory management approaches are focusing on dedicated installations and modifications of service trolleys or the galley monument itself, the present invention provides a portable solution that can be retrofitted to basically any kind of vehicle cabin. The portable device comes with all necessary sensors, which means that the cabin environment basically does not require any change at all. By means of the wireless connection, the present device is able to collect, to process and to send relevant data from and towards technical elements internal or external to the vehicle to enable a powerful inventory management that can be used not only for onboard goods management but also for extensive off-board data analysis. To this end, data handling and analysis may be split into an on-board part and complementary an off-board part. Access to the data may be handled in any meaningful manner and could be technically realized as a universal platform and/or cloud service.

A wireless connection according to the invention can be implemented, for example, by means of a wireless local network, e.g. a WLAN or the like. Different embodiments are conceivable for this purpose. For example, a wireless network which is already present for other purposes in a passenger cabin can be used. On the other hand, it is conceivable to make available a separate wireless network specifically for this purpose. This may be, in particular, a secured network which can only be accessed by persons or devices with corresponding security authentication, e.g. the on-board personnel of the vehicle and/or corresponding electronic devices which are to be/can be operated only by the on-board personnel.

Advantageous embodiments and improvements of the present invention are found in the subordinate claims.

According to an embodiment of the invention, the product-identification device may comprise an identification unit configured as a camera adapted to take images of consumer products, a barcode reader adapted to scan barcodes on consumer products and/or a wireless reader adapted to read out data tags on consumer products.

The product-identification device may thus basically be an electronic equipment with a camera to capture still images and/or movies, a scanner able to identify one or multi-dimensional barcodes (such as linear barcodes or QR codes) and/or a wireless reader adapted to read-out data tags (e.g. via Near-Field Communication, NFC). The camera may be positioned in a way that if the product-identification device is mounted, the camera is able to automatically capture pictures or movies for all items placed before or passed by the product-identification device, e.g. products on a tray removed or inserted into a service trolley or a galley monument, on which the product-identification device is mounted. The barcode reader may be positioned in a way that items (such as cans or packaged food) may be scanned by a user in a convenient and/or ergonomic position. The wireless reader may be configured and arranged within the portable device such that the maximum read-out distance is not exceeded at any time during handling of the respective service device if the portable device is mounted on the service device, which means that the corresponding data tags may be read-out contactless at any time during operation of the service device.

According to an embodiment of the invention, the product-identification device may comprise a control unit configured to analyze the images taken with the camera to reconstruct visible characteristics of the consumer product on basis of object recognition algorithms. The control unit may be particularly configured to utilize AI or machine learning algorithms for this purpose.

The embedded controller and corresponding software may hence be designed in a way that object recognition algorithms including, for example, advanced machine learning or AI tools, could be running on the portable device itself. Alternatively, or additionally, it would also be possible to run advanced and extensive data analysis algorithms within an on-board software framework and/or as part of an external (central) data acquisition entity that many handle data not only from one vehicle but, for example, from a complete fleet of vehicles. The system can be designed for general object recognition to capture shapes, colors, etc. of objects and/or surfaces.

The portable device of this embodiment is not limited to identifying the consumer products that are handed out to the passenger and/or are received back by the crew. In addition, properties of the consumer goods may be determined on basis of the used reconstruction algorithms. Machine learning and artificial intelligence tools may help to analyze images and/or movies taken from consumer products like beverages and meals during service in order to assess and analyze if and how much of the food and the drinks that are served are actually consumed. These information may be collected by means of the on-board wireless connection and may be basically instantaneously available for the cabin crew, which may then react accordingly. The invention may therefore help to enhance the catering service.

The present invention may thus be a key to allow a fully platform-agnostic catering process. To allow a full service and to create the services for different uses, the smart algorithmic portion may be split in an on-board part (e.g. running on a data infrastructure of the vehicle) and an off-board part for deep post-mission analytics (e.g. as part of Big Data analytics). The on-board portion may not only run on a central server or other platform of the vehicle (e.g. a galley control) but may also be implemented directly into the portable device itself in order to provide a decentralized solution. Alternatively, as mentioned before, it could also be implemented on any available on-board open software platform hosted in the data backbone infrastructure of the respective vehicle. The necessary communication path between the portable product-identification device and the data backbone infrastructure may then be provided by the wireless network.

By connecting the on-board portion to an off-board platform, AI could process the data and other information from the A/C to have data analytics available for various kinds of dashboards or even to predict food trends or inventory provisions. It could also help to improve and streamline the overall catering processes, such as automatic billing procedures.

According to an embodiment of the invention, the product-identification device may be configured to examine consumer products on service trays and to communicate corresponding inventory management information to the central inventory via the wireless network. The product-identification device may be configured in particular to examine a consumption status of the consumer products on the service trays.

Hence, the present invention may particularly be used to monitor and statistically analyze the complete catering process on board of a vehicle. Hence, it may be assessed, for example, how much waste is generated based on meals served and/or consumed, how much meals of what type are served and eaten, how much drinks are consumed and so on. This data can then be used to enhance the passenger experience and to improve the catering with the goal to maximize cabin crew efficiency, passenger satisfaction and to minimize costs and waste production. The corresponding machine learning algorithms may easily be trained and upgraded during preparation on ground or during operation in the galley to fit for all catering scenarios. By connecting the on-board portion to an off-board platform, machine learning could process the data and other information from the vehicle to have data analytics available for various kinds of dashboards or even to predict food trends or inventory provisions. It could also help to improve and streamline the overall catering processes, such as automatic billing procedures.

According to an embodiment of the invention, the clamping arm may be configured to releasably clamp the holder to a correspondingly formed handle bar on the service device.

Hence, handle bars that are already present within the vehicle cabin for the use of the crew and/or the passengers, e.g. on service trolleys, on galley monuments on cabin walls etc., can be utilized for the present purpose. The holder, along with the clamping arm and the mounting plate, may be suitably dimensioned such that there is enough free space to operate the handle of the service device without any conflict between the portable device and the human hand. Installation of the present system hence does not require any modification of the vehicle cabin or the service structures/devices within the vehicle.

According to an embodiment of the invention, the service device may be a service trolley or a galley monument.

For example, service trolley are usually provided with one or several handle bars on an upper side, by which means the trolleys can be pushed or pulled through the passenger cabin. The portable device of the invention may be mounted via the holder to the respective trolley handle and may thereby monitor the catering process carried out from this trolley from above. The portable device and the holder may be provided with appropriate dimensions such that there is still enough room left along the handle bar to operate the handle of the trolley as usual without any clashes between the portable device and the hands of the operator.

According to an embodiment of the invention, the product-identification device may be configured to automatically examine consumer products on service trays while they are removed from and/or supplied to the service device.

The portable product-identification device may for example be mounted on top of a service trolley or galley monument with the identification unit pointing downwards to a dispensing opening of the respective service device. The portable product-identification device may then continuously monitor the dispensing opening and record any consumer product and/or tray laden with goods that passes below the portable device either into or out of the service device. By employing suitable visual reconstruction algorithms, the system may then assess whether the meals and drinks have been be consumed or not and if yes to what extent. It is to be understood that the provided equipment may also be used to assess various other properties of the consumer products.

According to an embodiment of the invention, the product-identification device may be configured as a portable computer having a display for displaying inventory management information.

For example, the product-identification device may be a tablet computer or personal electronic device having a touch display to indicate relevant information towards the user and to received respective input and/or commands by the user. It is to be understood that the product-identification device may hence feature a battery for autonomous operation, a control unit with memory, suitable software, an ergonomic housing, a variety of data interfaces (e.g. Bluetooth, NFC, WiFi, USB, GPS, motion sensor) and so on.

According to an embodiment of the invention, the product-identification device may be configured to exchange inventory management information with a galley control of the vehicle, an inventory database of the vehicle and/or an external entity communicatively coupled to the vehicle. The inventory management information may then be particularly used for off-board post-operation analysis.

The data exchange may not be limited to information relating to the consumer products, but may additionally also comprise passenger information and other helpful information for cabin operation. In other words, the product-identification device will provide multiple data interfaces for operation purposes.

Hence, on the one hand, the system may provide a portable device with appropriate hardware and software to collect and, as the case may be, analyze the collected data. On the other hand, the system may however also distribute raw and/or (pre-) processed data to the suitable entities on board of or outside the vehicle. For example, the device may then be linked via the wireless connection and the available on-board data backbone infrastructure to a ground service platform, using the acquired data and other relevant parameters and/or information to extend analytics and to provide solutions for respective services (e.g. by presenting results in appropriate dashboards).

According to an embodiment of the invention, the mounting plate may be configured to form a plug-in, snap-and-click and/or magnetic connection with the product-identification device.

For example, the device holder may be built with an easy snap plate that allows the counterpart on the portable device itself to be clicked on and off in a quick and simple manner. In another example, magnetic means may be provided on the portable device and the holder for further ease of use. The person of skill will readily conceive various other suitable connection means that will allow the user to quickly and easily mount and demount the portable device to and from the holder.

According to an embodiment of the invention, the mounting plate may be pivotably mounted on the holder.

By these means the portable device may be swiveled along one or several axes with respect to the holder, e.g. to find a convenient usage position or to increase the space available around the portable device to access the service device behind it or underneath it.

According to an embodiment of the invention, the clamping arm may be configured with a flexible bushing element to adapt the clamping arm to different handle bar diameters.

This device holder is thus able to adapt to all available shapes of trolley handles by combining a fast snap clamping device and a flexible bushing element to cope with the differences available on the market.

The invention will be explained in greater detail with reference to exemplary embodiments depicted in the drawings as appended.

BRIEF DESCRIPTION OF THE DRAWING

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
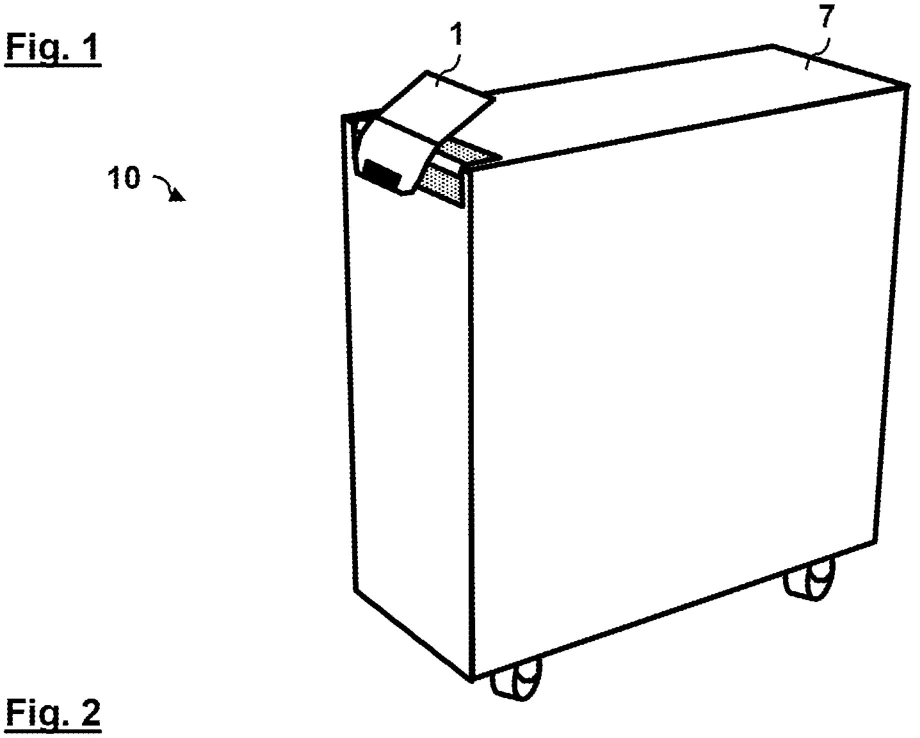
FIG. 1 schematically depicts a perspective view of an inventory management system according to an embodiment of the invention.
Figure 2:
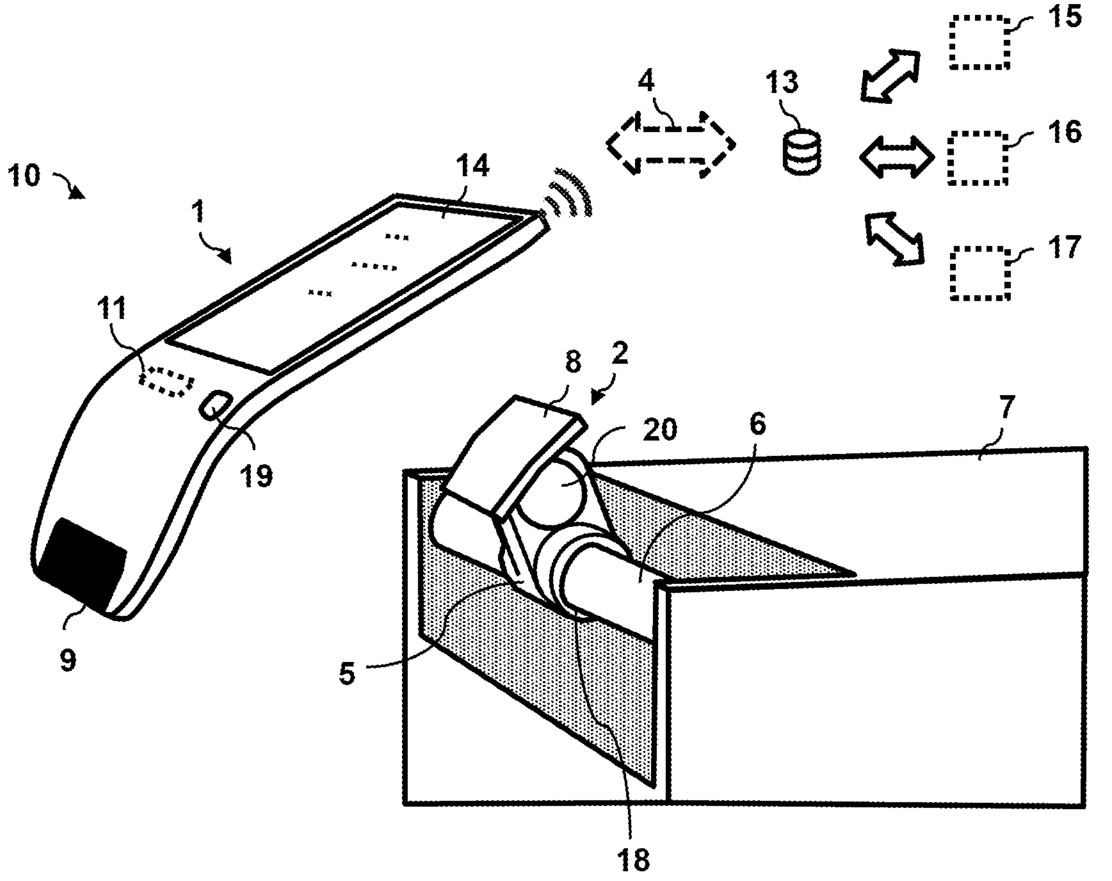
FIG. 2 schematically shows a detailed view of the system from FIG. 1.

FIG. 1 schematically depicts a perspective view of an inventory management system 10 according to an embodiment of the invention. The system 10 is also shown in FIG. 2 in a detailed view.

Figure 5:
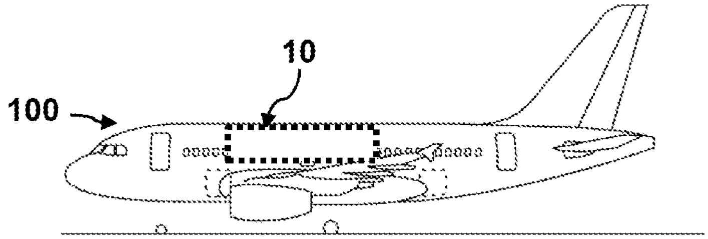
FIG. 5 is a schematic side view of an aircraft having the system from FIGS. 1 and 2.

The inventory management system 10 is provided to manage consumer products 3 on a vehicle, e.g. a passenger aircraft 100 as exemplarily shown in FIG. 5. Consumer products or goods within the present meaning comprise not only food and drinks but also any other product available for passengers and/or the crew on an airplane, e.g. towels, toilet paper, magazines, duty free products and so on. The system 10 provides a simple yet highly effective means to collect any data related to distribution, consumption and/or wastage of consumer goods on an aircraft. These data may not only be collected by the crew members but they may also get analyzed already on-board of the aircraft 100. Additionally, or alternatively, the data may also be transferred to an entity off-board for detailed analysis and/or storage.

The system 10 is provided in order to enhance crew efficiency and passenger convenience and ultimately improve the full end to end chain from meal production to supply chain, service and finally waste collection and handling. The primary goal of the presently followed solution is to provide a highly effective approach that does not require any modification to the existing infrastructure on the aircraft 100. This means that the inventory management system 10 can be easily retrofitted to conventional aircraft not yet equipped with the appropriate tools.

To this end, the present solution provides a portable product-identification device 1 configured to identify a consumer product 3 presented to the product-identification device 1, e.g. by placing or holding it close to the product-identification device 1 or by moving it past it. More specifically, the product-identification device 1 of this embodiment comprises at one end (cf. FIG. 2) an identification unit 9 configured with a camera adapted to take images of consumer products 3 and a barcode reader adapted to scan barcodes 21 on consumer products 3. It is to be understood however that the identification unit 9 may comprise further suitable means in this regard in other embodiments, e.g. a wireless reader adapted to read out data tags 22 on consumer products 3, e.g. an NFC reader for reading out NFC tags.

In the depicted embodiment, the portable product-identification device 1 is configured as a portable computer, e.g. a tablet computer, with a touch display 14 to display relevant information towards the user, in particular inventory management information, the display 14 being controlled by a control unit 11, e.g. a microprocessor. The device 1 may also comprise an electric battery, transient and/or non-transient storage means, adequate software and an ergonomic housing.

In addition, the product-identification device 1 is configured to communicatively connect to a wireless network 4 of the aircraft 100 to update a central inventory 13 of the vehicle based on the identified consumer product 3. The product-identification device 1 may generally be adapted to exchange inventory management information with various entities on board of the aircraft 100 or external to it, e.g. a galley control 15 of the aircraft 100, an inventory database 16 of the aircraft 100, which may be part of a backbone computing infrastructure of the aircraft 100, as well as an external entity 17 communicatively coupled to the aircraft 100, e.g. a ground control, a supplier/caterer network etc. The system 10 in that sense may hence communicate with or be part of a larger communication, data collection and/or analysis network being split into an on-board part and an off-board part. By means of the wireless connection of the portable device 1, the system 10 is able to collect, to process and to send relevant data from and towards technical elements to enable a powerful inventory management. Access to the data could be technically realized via a universal platform and/or cloud service or the like.

Capturing the data is key to enable full service capabilities. As economic viability is important, the technical means should be as "easy" as possible and should require few to none modifications of the cabin elements involved. Therefore, presently the portable device 1 is not permanently fixed within the cabin, but may be mounted as needed to the handle bar 6 of any service device 7, e.g. catering trolley or a galley monument.

To this end, the system 10 comprises a detachable holder 2 having a clamping arm 5 configured to releasably clamp the holder 2 to a correspondingly formed handle bar 6 on the service device 7 and having a mounting plate 8 configured to releasably attach to the portable device 1 to mount the product-identification device 1 on the holder 2 and thereby on the respective service device 7 within the aircraft 100. The clamping arm 5 may be configured with a flexible bushing element 18 to adapt the clamping arm 5 to different handle 6 bar diameters. The mounting plate 8 may be adapted to form, for example, a snap-and-click and/or a magnetic connection with the portable device 1 and may furthermore be pivotably mounted on the holder 2 (cf. pivot 20 in FIG. 2).

Hence, the device holder 2 is on one side able to adapt to all available shapes of trolley handles by combining a fast snap clamping device 5 and a flexible bushing element 18 to cope with the differences available on the market. On the other side, the device holder 2 is built with an easy snap plate 8 that allows the counterpart on the portable device 1 itself very easy to be clicked on and off. Both mountings may be adequately dimensioned such that there is enough free space in-between to operate the handle of the service device 7 as usual without any clashes between the portable device 1 and the human hand.

Figure 3:
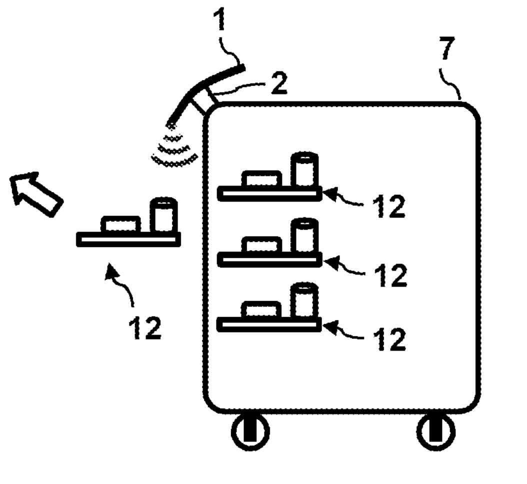
FIG. 3 schematically shows a side view of a service trolley used in the system from FIGS. 1 and 2.
Figure 4:
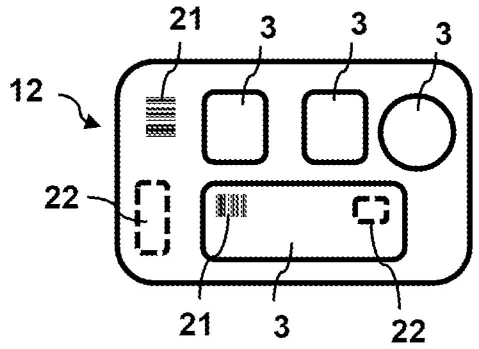
FIG. 4 schematically shows a service tray used in the system from FIGS. 1 and 2.

Exemplary use cases of the presently described system 10 can be better understood with reference to FIGS. 3 and 4. As mentioned before, the portable device 1 is provided with an identification unit 9 for identifying consumer products 3 visually by taking and analyzing images, as individual pictures and/or as movies, or by scanning barcodes 21 or reading out data tags 22. The consumer products 3 may, for example, be placed on a service tray 12 as shown in FIG. 4 (e.g. food, beverages and so on), which is supplied from a service device 7, e.g. a service trolley. The portable device 1 may be mounted on a handle bar 6 on an upper side of the service device 7 above a dispensing opening from which the service trays 12 may be taken. The identification unit 9 may be arranged on a lower end of the portable device 1 such that barcodes 21 and data tags 22 on the consumer products 3 and/or on the service trays 12 can be automatically read out by simply passing the service tray 12 below the portable device 1, e.g. when taking the trays 12 from the service device 7 during service or when moving them back into it after food distribution.

As mentioned before, the consumer products 3 may also be identified visually by analyzing the images taken with the identification unit 9. To this end, the control unit 11 of the portable device may be configured to analyze the images taken with the camera to reconstruct visible characteristics of the consumer product 3 on basis of object recognition algorithms. The control unit 11 may use such software tools to not only identify the products 3 but in addition determine a consumption status or other properties of the products 3, e.g. by determining that a food container is partially or completely emptied. The extracted information may then be communicated via the wireless network 4 to update the central inventory 13.

To this end, machine learning and/or AI processing will be a key enabler to analyze the pictures and/or the movies taken from the beverages and meals during service. To allow a full service and to create the services for different uses, the respective AI portion may be split in an on-board part and another one as off-board for deep post flight analytics. The on-board portion could be implemented directly on the portable device 1 as a more powerful decentralized solution. The respective software could however not only run on the control unit 11 of the portable device 1 but also on a central backbone infrastructure of the aircraft 100. By further connecting the on-board portion to an off-board platform, AI and machine learning tools could process the data and other information from the aircraft 100 to have data analytics available for various kinds of dashboards or even to predict food trends or inventory provisions across a whole fleet of vehicles as well as transport and supply chains. It could also help to improve and streamline the overall catering processes, such as automatic billing procedures.

The system 10 of this embodiment hence combines three elements: a scanning device 1 for scanning service trays 12 and consumer products 3 (via images, movies, barcodes, data tags), a removable and universal holder 2 for mounting the portable scanning device 1 on any trolley or galley handle 6, and adequate analysis software based on advanced machine learning and AI algorithmic to analyze and process the scanned data. The system 10 may then be linked via the wireless network 4 and an available on-board data backbone infrastructure to a ground service platform, using the scanner data and other relevant aircraft parameters to extend analytics and to provide solutions for respective services.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

LIST OF REFERENCE SIGNS

1 portable product-identification device
2 detachable holder
3 consumer product
4 wireless network
5 clamping arm
6 handle bar
7 service device
8 mounting plate
9 identification unit
10 Inventory management system
11 control unit
12 service tray
13 central inventory
14 display
15 galley control
16 inventory database
17 external entity
18 flexible bushing element
19 on-button
20 pivot
21 bar code
22 data tag
100 aircraft

What is claimed is:

1. An inventory management system for managing consumer products on a vehicle or an aircraft, the inventory management system comprising:
- a portable product-identification device configured to:
  - identify a consumer product presented to the product-identification device; and
  - communicatively connect to a wireless network of the vehicle or the aircraft to update a central inventory of the vehicle or the aircraft based on the identified consumer product; and
- a detachable holder comprising:
  - a clamping arm configured to releasably clamp the holder to a handle bar of a service device within the vehicle or the aircraft, such that the holder is attachable to and detachable from the service device during operation of the service device; and
  - a mounting plate configured to releasably attach to the product-identification device to mount the product-identification device on the holder and, thereby, on the service device within the vehicle or the aircraft;
- wherein the mounting plate positions the product-identification device above a dispensing opening of the service device, such that an identification unit of the product-identification device is oriented toward the dispensing opening; and
- wherein the product-identification device is configured to automatically identify consumer products on service trays while the service trays pass through the dispensing opening during removal from and/or return to the service device, wherein positioning of the product-identification device above the dispensing opening enables the automatic identification of the consumer products during passage of the service trays through the dispensing opening.

2. The inventory management system according to claim 1, wherein
- the identification unit is configured as at least one of:
- a camera to take images of the consumer products;
- a barcode reader to scan barcodes on the consumer products, and
- a wireless reader to read out data tags on the consumer products.

3. The inventory management system according to claim 1, wherein;
- the identification unit is a camera configured to take images of the consumer products; and
- the product-identification device comprises a controller configured to analyze the images taken with the camera to reconstruct visible characteristics of the consumer products on a basis of object recognition algorithms, or AI or machine learning algorithms.

4. The inventory management system according to claim 1, wherein, when the product-identification device automatically identifies the consumer products on the service trays passing through the dispensing opening, the product-identification device is configured to communicate corresponding inventory management information to the central inventory via the wireless network.

5. The inventory management system according to claim 4, wherein the product-identification device is configured to examine a consumption state of the consumer products on the service trays.

6. The inventory management system according to claim 1, wherein the service device is a service trolley or a galley monument.

7. The inventory management system according to claim 1, wherein the product-identification device is configured as a portable computer having a display for displaying inventory management information.

8. The inventory management system according to claim 1, wherein the product-identification device is configured to exchange inventory management information with at least one of a galley control of the vehicle or the aircraft, an inventory database of the vehicle or the aircraft, and an external entity communicatively coupled to the vehicle or the aircraft, for off-board post-operation analysis.

9. The inventory management system according to claim 1, wherein the mounting plate is configured to form a plug-in connection with the product-identification device.

10. The inventory management system according to claim 1, wherein the mounting plate is pivotably mounted on the holder.

11. The inventory management system according to claim 1, wherein the clamping arm comprises a flexible bushing element configured to adapt the clamping arm to different handle bar diameters.

12. An aircraft having an inventory management system according to claim 1.

13. The inventory management system according to claim 1, wherein;

the mounting plate is configured to form a snap-and-click connection with the product-identification device; or the mounting plate is configured to form a magnetic connection with the product-identification device; or the mounting plate is configured to form at least two of a plug-in connection, a snap-and-click connection, and a magnetic connection with the product-identification device; or the mounting plate is configured to form a plug-in connection, a snap-and-click, and a magnetic connection with the product-identification device.

14. The inventory management system according to claim 1, wherein:

the identification unit is configured as a camera adapted to take images of the consumer products;

the product-identification device comprises a controller configured to analyze the images taken with the camera to reconstruct visible characteristics of the consumer products on the service trays using object recognition algorithms; and the product-identification device is configured to examine a consumption status of the consumer products on the service trays based on the reconstructed visible characteristics and to communicate corresponding inventory management information to the central inventory via the wireless network.

15. The inventory management system according to claim 1, wherein the product-identification device is configured such that the identification unit continuously monitors the dispensing opening to detect the consumer products passing through the dispensing opening and below the product-identification device.

16. The inventory management system according to claim 1, wherein the identification unit comprises a camera positioned on a lower portion of the product-identification device, the camera being positioned and configured to capture images of the consumer products on the service trays as the service trays pass through the dispensing opening.

17. The inventory management system according to claim 1, wherein the mounting plate is pivotably mounted to the holder to adjust an orientation of the product-identification device relative to the dispensing opening.

18. The inventory management system according to claim 1, wherein the product-identification device is configured to determine a consumption status of the consumer products on the service trays based on images captured by the identification unit during passage of the consumer products on the service trays through the dispensing opening.

19. The inventory management system according to claim 1, wherein the detachable holder and the product-identification device are configured for being removably installed on different service devices within the vehicle or the aircraft without structural modification of the service devices.

* * * * *